United States Patent [19]

Elsenpeter

[11] Patent Number: 4,682,345
[45] Date of Patent: Jul. 21, 1987

[54] ADAPTER FOR COUPLING TOGETHER TWO SUBSCRIBERS' LINES TO A TELEPHONE TEST SET

[75] Inventor: William R. Elsenpeter, Camarillo, Calif.

[73] Assignee: Harris Corporation, Melbourne, Fla.

[21] Appl. No.: 806,804

[22] Filed: Dec. 10, 1985

[51] Int. Cl.⁴ .......................... H04M 1/21; H04B 3/46
[52] U.S. Cl. ............................................ 379/1; 379/22
[58] Field of Search ................ 179/175.3 R, 175.3 R, 179/81 C, 99 H, 175

[56] References Cited

U.S. PATENT DOCUMENTS 4,517,414 5/1985 Boeckmann .................. 179/99 H X
4,564,728 1/1986 Romano ........................ 179/175.3 R Primary Examiner—Stafford D. Schreyer
Attorney, Agent, or Firm—Antonelli, Terry & Wands

[57] ABSTRACT

An improved two-line adapter having a pair of hold circuits for respectively placing first and second subscriber telephone lines on hold is disclosed. The individual circuits for placing the subscriber lines on hold include a circuit for continuously indicating the direction of current flow between the tip and ring lines of the individual subscriber lines to which the individual holding circuits are attached which simplifies placing conference calls between the two subscribers' lines and a telephone test set.

7 Claims, 2 Drawing Figures

ADAPTER FOR COUPLING TOGETHER TWO SUBSCRIBERS' LINES TO A TELEPHONE TEST SET

BACKGROUND OF THE INVENTION

1. Field of the Invention

The present invention relates to two-line adapters for connecting two telephone subscribers' lines together, for performing various tests, placing the lines on hold, and for connecting the lines together and a telephone test set in a conference call configuration.

2. Description of the Prior Art

FIG. 1 illustrates a two-line adapter which is known in the art. The two-line adapter illustrated therein is useful for performing diverse functions including the placing of each subscriber's lines on a hold and the establishment of a three-way conference call between the two subscribers' lines and the telephone test set.

The prior art two-line adapter of FIG. 1 has two pairs of leads 20 and 22 which are adapted to be coupled to the tip and ring lines respectively of two subscribers' lines (not illustrated). The leads 20 are coupled to a protection circuit 24. The leads 22 are coupled to a protection circuit 26. The protection circuits 24 and 26 are of identical construction and function to protect the test set against damage due to high currents which can occur in a fault condition. To place the subscriber's line 20 on a hold, a two pole triple throw switch 28 is positioned to the position labelled "HOLD". To place a subscriber's line 22 on hold, a two pole triple throw switch 30 is positioned to the position labelled "HOLD". In the "HOLD" position, each respective tip-ring pair, 20 and 22, via respective protection circuits 24 and 26, is connected to a pair of oppositely poled Zener diodes 32 and 34 which provide an impedance that is interpreted by the telephone company's central office as representing the closed loop of a telephone call. A telephone test set 36 is connected to the "ON" outputs of the switches 28 and 30. A polarity indicator 38, which indicates the direction of current flow between a single tip and ring line that is comprised of a pair of oppositely poled light emitting diodes 40 and 42, is connected between the terminals labelled "ON" of the two pole triple throw switches 28 and 30 and the pole of switch 44. When the pole of switch 44 is connected to terminal 46, a polarity test is performed. Tone generator 48 is provided to permit the telephone test set to inject tone onto a particular telephone subscriber line 22. The pole of switch 50 is connected to terminal 51 to conduct the tone injection.

With the circuit illustrated in FIG. 1, in order to set up a conference call between the telephone test set 36 and the subscriber's lines 20 and 22, it is necessary to check the polarity of the connections of the pair of leads 20 and 22 to each of the telephone subscriber's lines. The reason for the polarity check is that the battery of the central office must be connected to each subscriber's line with the same polarity so that the polarities of the tip and ring lines of the two subscribers' lines are not reversed. If a reversal of the polarities of the two subscribers' lines occurs, the telephone company central office may interpret one or both lines as being on hook which will cause the line connection to the central office to be lost for the placing of the conference call. Even if the connections are not lost, the telephone test set 36 will not receive sufficient voltage from the central office to permit it to be part of a conference call.

Thus, with the circuit illustrated in FIG. 1, it is necessary to sequentially position the two pole triple throw switches 28 and 30 to have their upper poles in contact with the terminal labelled "ON" to conduct the requisite polarity tests. Because of the necessity to sequentially change the upper poles of the switches 28 and 30 to contact the "ON" terminal, there is no continuous indication of the polarity of the connections of the respective pairs of leads 20 and 22 to the subscriber's lines which is useful to linepersons. Because linepersons using telephone test sets often have their hands full, it is undesirable to sequentially have to position the switches 28 and 30 in the manner described above. Moreover, if an error is made by having the polarities of the pairs of lines 20 and 22 coupled oppositely to each other to the tip and ring lines of the respective subscriber's telephone lines, it may be impossible to set up the conference call because of the fact that when the attempt is made to place the second line on hold by calling through to the central office either the first, second, or both line connections with the central office may be lost and the telephone test set 36 cannot participate in the conference call because of an insufficient voltage. This will necessitate that the lineperson will have to reconnect the polarity of one of the two pairs of lines 20 and 22 in the opposite manner and to further have to go through the whole process of redialing the particular subscriber's lines through the central office, and place each line sequentially on hold to establish the three-way conference call involving the subscriber's lines and the telephone test set 36. Thus, the circuit of FIG. 1 requires sequential movement of the upper poles of the two pole triple throw switches 28 and 30 to conduct the requisite polarity test for placing a conference call and further does not provide a continuous polarity indication of a particular subscriber's lines.

U.S. Pat. No. 4,490,583 discloses a plural line telephone controller which permits plural subscribers' telephone lines to be placed on hold and connected to other subscribers' telephones.

SUMMARY OF THE INVENTION

The present invention provides an improved two-line adapter for use with telephone test sets. In accordance with the two-line telephone adapter of the present invention, a continuous display of the direction of current flow between the two subscribers' telephone lines is produced which permits the lineperson to readily set up conference calls without the possibility of losing a completed call because of the cross coupling of the polarities of the individual lines of the subscribers' lines which might cause the telephone central office to interpret one or both of the calls as being terminated which would cause a disconnect at the central office with one or both of the subscriber's lines. Moreover, the polarity indicating circuit being part of the hold circuit performs a dual function of providing part of the impedance necessary to maintain the loop current for the holding of a line and further providing the continuous indication of the direction of current flow within each of the subscribers' lines to which the two-line adapter is connected which is useful in setting up conference calls in the shortest possible time.

A two-line adapter for connecting two subscriber telephone lines to a telephone test set in accordance with the invention includes a first pair of leads comprised of a first and a second lead each having first and second terminals, the first terminal of the first lead being adapted to be connected to a tip line of the first subscriber's line and the first terminal of the second lead being adapted to be connected to a ring line of the first subscriber's line; a second pair of leads comprised of a first and a second lead each having first and second terminals, the first terminal of the first lead of the second pair being adapted to be connected to a tip line of a second subscriber's line and the first terminal of the second lead of the second pair being adapted to be connected to a ring line of the second subscriber's line; a third pair of leads comprised of first and second leads each having first and second terminals; a fourth pair of leads comprised of first and second leads each having first and second terminals, the second terminal of the first lead of the third pair of leads being coupled to the second terminal of the first lead of the fourth pair of leads and the second terminal of the second lead of the third pair of leads being coupled to the second terminal of the second lead of the fourth pair of leads; a circuit for placing the first subscriber's line on hold including an indicator for continuously indicating the direction of current flow between the tip and ring lines of the first subscriber's line and first and second terminals which are respectively adapted to be connected to the tip and ring lines of the first subscriber's line; a hold circuit for placing the second subscriber's line on hold including an indicator for continuously indicating the direction of current flow between the tip and ring lines of the second subscriber's line and first and second terminals which are respectively adapted to be connected to the tip and ring lines of the second subscriber's line; a first double pole triple throw switch having three positions of the two poles, the first position (labelled "ON HOOK"), leaving the first terminal of the first lead of the first pair of leads and the first terminal of the second lead of the first pair of leads not connected to the tip and ring lines of the first subscriber's line, the second position (labelled "OFF HOOK"), connecting the second terminals respectively of the first and second leads of the first pair of leads to the first terminals of the first and second leads of the third pair of leads and the third position (labelled "HOLD"), connecting the second terminals respectively of the first and second leads of the first pair of leads respectively to the terminals of the circuit for placing the first subscriber's line on hold; and a second double poled triple throw switch having three positions of the two poles, the first position (labelled "ON HOOK") leaving the first terminal of the first lead of the second pair of leads and the first terminal of the second lead of the second pair of leads not connected to the tip and ring lines of the second subscriber's line, the second position (labelled "OFF HOOK") connecting the second terminals respectively of the first and second leads of the second pair of leads to the first terminals of the first and second leads of the fourth pair of leads and the third position (labelled "HOLD") connecting the second terminals respectively of the first and second leads of the second pair of leads respectively to the terminals of the circuit for placing the second subscriber's line on hold. Preferably, the circuit for indicating the direction of current flow in each of the circuits for placing the first and second subscribers' lines on hold is a pair of oppositely poled light emitting diodes which are connected in parallel to each other. The parallel connection of the diodes is respectively connected between the first and second terminals of the circuit for placing the particular subscriber's line on hold. A voltage limiter and a resistance may be connected in parallel with the series combination of the parallel connection of the oppositely poled light emitting diodes and a resistance to provide a proper impedance for maintaining loop current necessary to maintain the hold condition. Preferably, each of the double poled triple throw switches have make before break switching contacts which is important in maintaining line continuity when the two-line adapter is being switched to perform different functions.

DESCRIPTION OF THE PREFERRED EMBODIMENT

Figure 2:
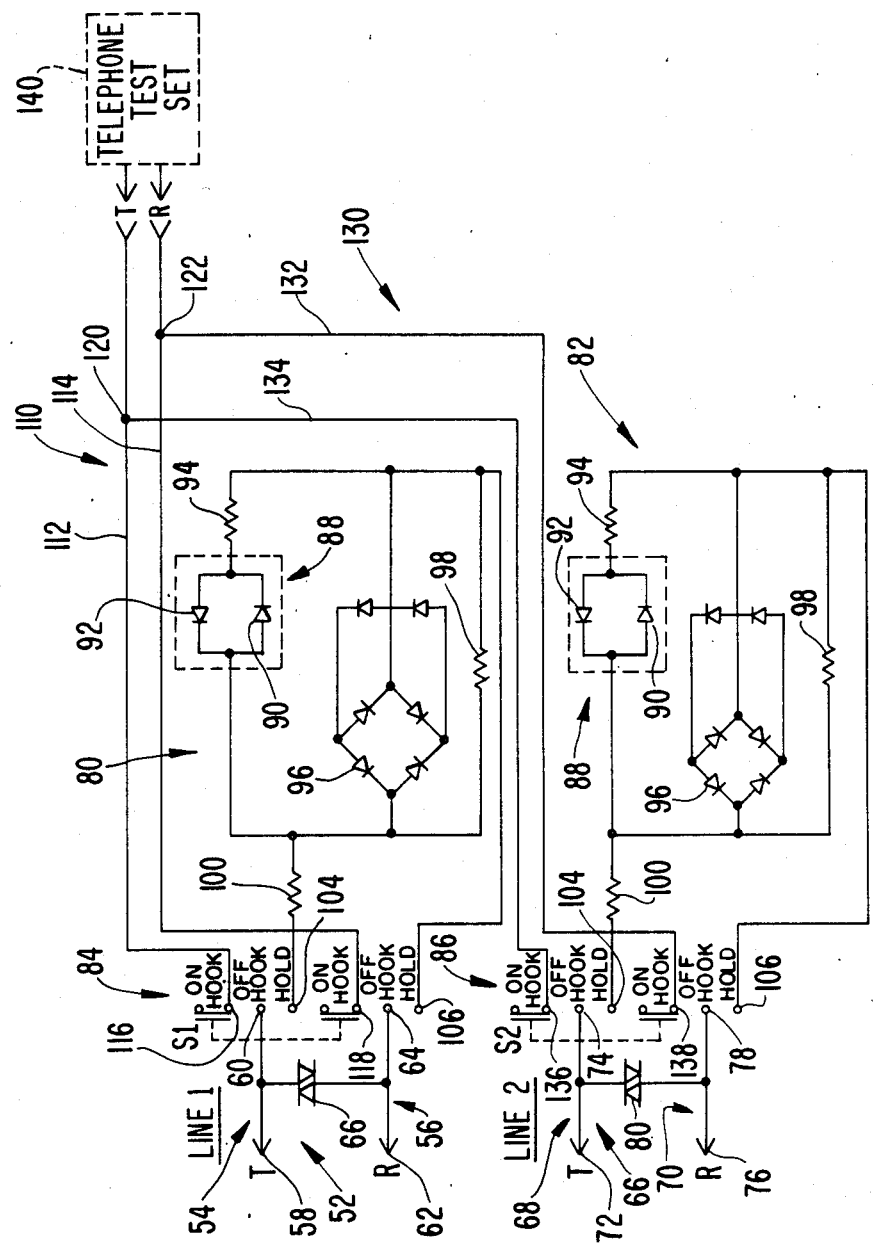
FIG. 2 illustrates a two-line adapter in accordance with the present invention.

FIG. 2 illustrates a two-line adapter in accordance with the present invention. A first pair of leads 52 which are comprised of a first lead 54 and a second lead 56 are adapted to be connected to the tip and ring lines of a subscriber's line (not illustrated) as respectively identified by the symbols "T" and "R". The line 54 has a first terminal 58 which preferably has a clip attached thereto (not illustrated) and a second terminal 60. The line 56 has a first terminal 62 to which preferably has a clip attached thereto (not illustrated) and a second terminal 64. A metal oxide varistor 66 shunts the lines 54 and 56 to provide protection from high voltage conditions. A second pair of lines 66 comprised of line 68 and line 70 are respectively adapted to be connected to the tip and ring lines of a subscriber's telephone line in a manner identical to that described above regarding the first pair of lines 52. The line 68 has a terminal 72 which preferably has a clip attached thereto (not illustrated) and a terminal 74. The line 70 has a terminal 76 which preferably has a clip attached thereto (not illustrated) and a terminal 78. A metal oxide varistor 80 shunts the lines 68 and 70 to provide protection from high voltage conditions.

First and second holding circuits 80 and 82 are respectively adapted to be connected to the first pair of leads 52 and the second pair of leads 66 selectively by means of a two pole triple throw switch 84 and a two pole triple throw switch 86.

The individual circuits 80 and 82 for placing the first and second subscriber's lines on hold are identical. Like parts are identified by like reference numbers. Each holding circuit contains a circuit for indicating the direction of current flow 88 between the tip and ring lines of the first and second subscribers' lines when the two pole triple throw switches 84 and 86 are respectively positioned to the "HOLD" position as illustrated. Each circuit for indicating the direction of current flow between the tip and ring lines is preferably a parallel combination of oppositely poled light emitting diodes 90 and 92. Typically, the light emitting diode 90 indicating current flow from the tip to the ring line is colored green which signifies to the lineperson that the polarity in which the leads 54 and 56 or 68 and 70 are connected to the tip and ring lines of the first and second subscriber's lines is correct. Thus, if the terminals 58 and 62 of line pair 54 and 56 are correctly connected to a subscriber's line pair of tip and ring lines, current flow will be through diode 90 when the switch 84 is positioned in the "HOLD" position. Typically, the light emitting diode 92 is colored red to indicate that the polarity of the lines to which the pair of lines 54 and 56 or 68 and 70 is connected is reversed. A resistor 94 is connected in series with the parallel combination 88 of the light emitting diodes 90 and 92. A bridge circuit 96 of diodes is connected in parallel with the series combination of the parallel combination of light emitting diodes 88 and resistor 94 to provide voltage protection to the individual diodes 90 and 92. A resistor 98 is connected in parallel with the bridge circuit 96 of diodes and the series combination of the parallel combination of the light emitting diodes 88 and resistor 94. A resistor 100 is connected in series with the parallel combination of resistor 98, bridge circuit 96, and the series combination of the parallel combination of light emitting diodes 88 and resistor 94. Each holding circuit 80 and 82 has a pair of terminals 104 and 106 which are respectively adapted to be connected to the pair of terminals 60 and 64 and 74 and 78 when the switches 84 and 86 are positioned in the "HOLD" position. The hold circuit performs the dual function of providing the indication of the direction of current flow which is important for tests to be performed by linepersons, including the setting up of conference calls between multiple subscriber lines and a telephone test set 140 and the combined impedance of elements 90, 92, 94, 96, 98 and 100 represents an impedance which establishes sufficient current flow between the tip and ring lines of each subscriber's line to cause the central office to which the individual subscribers' lines are connected to maintain the connection to continue the line on hold.

A third pair of leads 110, which is comprised of leads 112 and 114, selectively connect the line pair 52 to a telephone test set when the switch 84 is positioned to the "off hook" position to connect terminals 60 and 64 respectively to terminals 116 and 118 when a telephone line set 140 is coupled to terminals 120 and 122.

A fourth pair of leads 130 which is comprised of leads 132 and 134, connects the pair of leads 66 to the telephone test set 140 when the switch 86 is positioned to the "OFF HOOK" position which connects terminals 74 and 78, respectively, to terminals 136 and terminal 138.

Preferably each of the two pole triple throw switches 84 and 86 are make before break type switches which maintains the old circuit connection of the switch to a time after the making of the new circuit connection represented by a different position of the three possible throw positions to prevent discontinuities which could cause the central office to disconnect the line. Make before break switching elements are commercially available.

The advantage of the present invention in establishing a conference call between two subscribers' lines and a telephone test set 140 is explained as follows. When it is desired to set up a three-way conference call between the two subscriber lines to which the pairs of leads 52 and 66 are respectively attached, the lineperson calls the central office through the telephone test set 140 to establish a first completed call through the central office. This is accomplished by positioning the switch 84 in the "off hook" position and dialing through to the central office. Thereafter, the subscriber line to which the pair of leads 52 is attached is switched to the "HOLD" position by the moving of the poles of the switch 84 to the "HOLD" position. When in the "HOLD" position, the impedance of the holding circuit 80 causes the central office to detect sufficient line current to maintain the circuit connection. During the hold interval, the appropriate diode 90 or 92 will light up to indicate the direction of current flow between the tip and ring lines of the subscriber line to which the pair of leads 52 is connected. Next the lineperson switches the two pole triple throw switch 86 to the "HOLD" position to detect the polarity of the connection of the pair of leads 66 to the second subscriber's line. The direction of current flow between the tip and ring lines of that second subscriber's line will be indicated by the lighting of the appropriate diode 90 or 92. At this point the lineperson needs to merely visually inspect the continuous indication of polarity of both of the lines to determine if they are the same color to determine if the two subscriber lines can be properly placed into a conference call position because the respective polarities of the tip and ring lines of each of the subscriber lines are identical. If the polarities are reversed, the lineperson must reverse the connection of the individual terminals 72 and 76 to the second subscriber's line. Thereafter, the second line may be placed on hold after calling to the central office. Thereafter, the conference call between the first and second subscriber's lines and the telephone test set 140 is completed by placing both switches, 84 and 86, in the "OFF HOOK" position.

Figure 1:
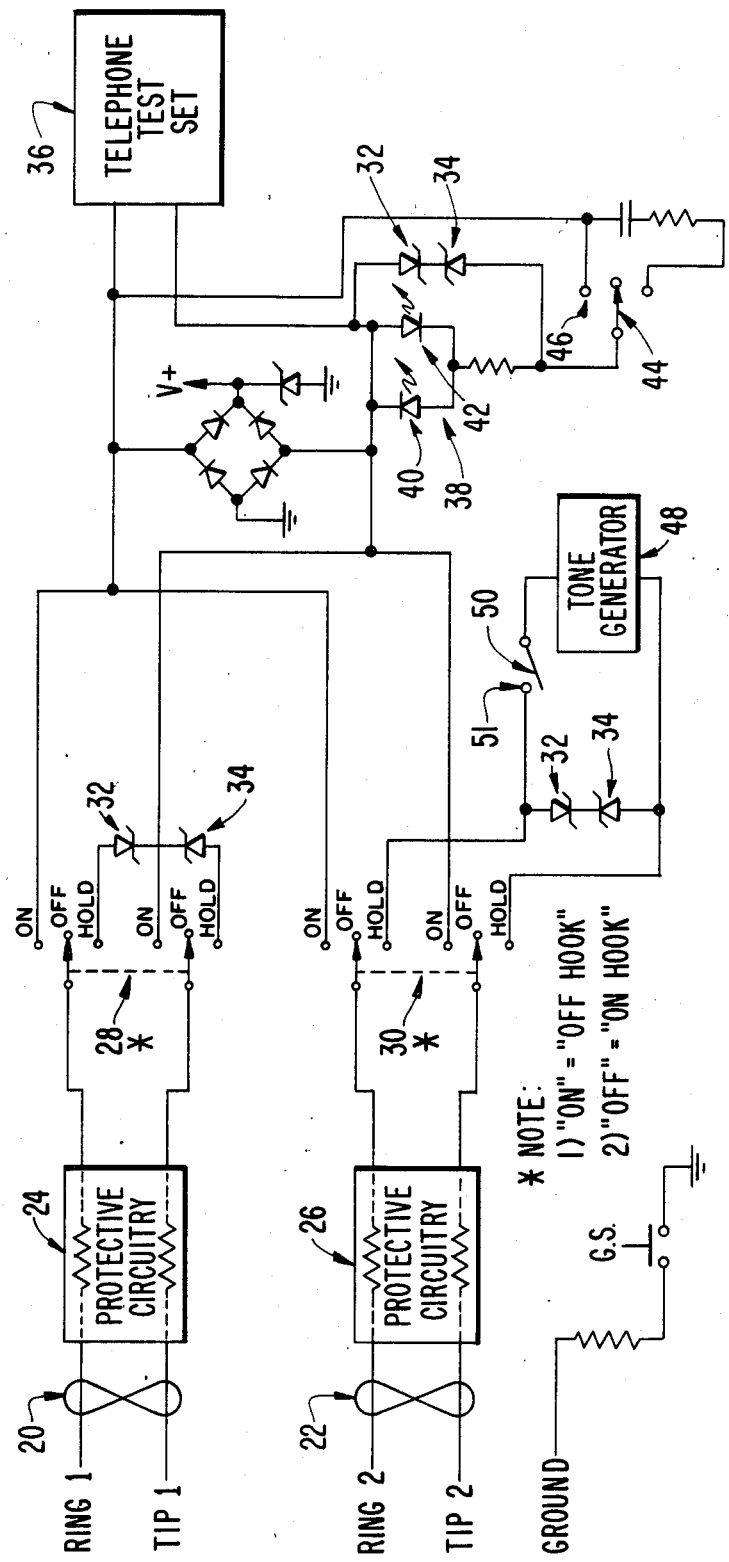
FIG. 1 illustrates a prior art two-line adapter.

The continuous polarity indication of each of the subscriber's lines to which the respective pairs of leads 52 and 66 are connected is advantageous to the lineperson for the reason that it simplifies the process of setting up a conference call between the two subscribers' lines because of the fact that there is a continuous indication of line polarity produced by both of the indicating circuits 88. The continuous display of the direction of current flow eliminates the possibility that the lineperson will forget the polarity of the first line when the switching connection is made to test the polarity of the second line can be the case with the prior art circuit of FIG. 1. In addition, some circuits reverse polarity during the progress of the call. Moreover, the placement of the circuits for indicating the direction of current flow within the holding circuit for each of the pairs of subscriber lines has the advantage of utilizing the impedance of the indicators as part of the necessary impedance for placing the line on hold which provides a circuit configuration having a small number of low cost circuit elements for performing the dual functions of placing the lines on hold and indicating the direction of current flow.

While the invention has been described in terms of its preferred embodiment, it should be understood that numerous modifications may be made thereto without departing from the spirit and scope of the invention as defined in the appended claims. It is intended that all such modifications fall within the scope of the appended claims.

I claim:

1. A two-line adapter for connecting two subscriber telephone lines to a telephone test set comprising:
    (a) a first pair of leads, comprised of a first and a second lead each having first and second terminals, the first terminal of the first lead being adapted to be connected to a tip line of the first subscriber's line and the first terminal of the second lead being adapted to be connected to a ring line of the first subscriber's line;
    (b) a second pair of leads comprised of a first and a second lead each having first and second terminals, the first terminal of the first lead of the second pair being adapted to be connected to a tip line of a second subscriber's line and the first terminal of the second lead of the second pair being adapted to be connected to a ring line of the second subscriber's line;

(c) a third pair of leads comprised of first and second leads each having first and second terminals;

(d) a fourth pair of leads comprised of first and second leads each having first and second terminals, the second terminals of the first lead of the third pair of leads being coupled to the second terminal of the first lead of the fourth pair of leads and the second terminal of the second lead of the third pair of leads being coupled to the second terminal of the second lead of the fourth pair of leads;

(e) means for placing the first subscriber's line on hold including means for continuously indicating the direction of current flow between the tip and ring lines of the first subscriber's line and first and second terminals which are respectively adapted to be connected to the tip and ring lines of the first subscriber's line;

(f) means for placing the second subscriber's line on hold including means for continuously indicating the direction of current flow between the tip and ring lines of the second subscriber's line and first and second terminals which are respectively adapted to be connected to the tip and ring lines of the second subscriber's line;

(g) a first double pole triple throw switching means having three positions of the two poles, the first position leaving the first terminal of the first lead of the first pair of leads and the first terminal of the second lead of the first pair of leads not connected to the tip and ring lines of the first subscriber's line, the second position connecting the second terminals respectively of the first and second leads of the first pair of leads to the first terminals of the first and second leads of the third pair of leads and the third position connecting the second terminals respectively of the first and second leads of the first pair of leads respectively to the terminals of the means for placing the first subscriber's line on hold; and (h) a second double pole triple throw switching means having three positions of the two poles, the first position leaving the first terminal of the first lead of the second pair of leads and the first terminal of the second lead of the second pair of leads not connected to the tip and ring lines of the second subscriber's line, the second position connecting the second terminals respectively of the first and second leads of the second pair of leads to the first terminals of the first and second leads of the fourth pair of leads and the third position connecting the second terminals respectively of the first and second leads of the second pair of leads respectively to the terminals of means for placing the second subscriber's line on hold.

2. A two-line adapter in accordance with claim 1 wherein:

(a) the means for continuously indicating the direction of current flow in the means for placing the first subscriber's line on hold comprises a parallel connection of oppositely poled light emitting diodes which is connected between the first and second terminals of the means for placing the first subscriber's line on hold; and (b) the means for continuously indicating the direction of current flow in the means for placing the second subscriber's line on hold comprises a parallel connection of oppositely poled light emitting diodes which is connected between the first and second terminals of the means for placing the second subscriber's line on hold.

3. A two-line adapter in accordance with claim 2 wherein each parallel connection of oppositely poled diodes is in series with a resistance which series combination is in parallel with a voltage limiter.

4. A two-line adapter in accordance with claim 1 wherein each of the doule pole triple throw switching means has make before break switching function.

5. In a two-line adapter for connecting two telephone lines to a telephone test set in which a separate hold circuit is provided for selectively placing each of the telephone lines on hold, the improvement comprising:
each hold circuit having means for continuously indicating the direction of current flow between a tip and ring line of an associated telephone line.

6. A two-line adapter for connecting two subscriber telephone lines to a telephone test set as in claim 5 wherein the means for continuously indicating the direction of current flow in each hold circuit comprises a parallel connection of oppositely poled light emitting diodes connected between first and second terminals of the hold circuit.

7. A two-line adapter for connecting two telephone lines to a telephone test set in accordance with claim 6 wherein the parallel connection of oppositely poled diodes is in series with a resistance which series combination is in parallel with a voltage limiter.

* * * * *